United States Patent
Sakakibara

Patent Number: 5,273,314
Date of Patent: Dec. 28, 1993

[54] SUPPORTING BRACKET FOR KNEE PANEL

[75] Inventor: Kimio Sakakibara, Nishio, Japan

[73] Assignee: Toyota Jidosha Kabushiki Kaisha, Toyota, Japan

[21] Appl. No.: 962,874

[22] Filed: Oct. 19, 1992

[30] Foreign Application Priority Data

Oct. 17, 1991 [JP] Japan .................. 3-269157

[51] Int. Cl.⁵ .......................................... B60R 21/045
[52] U.S. Cl. ..................................... 280/752; 188/377; 248/548
[58] Field of Search ....................... 280/752, 750, 748; 188/371, 377; 248/548; 296/189

[56] References Cited

U.S. PATENT DOCUMENTS

| | | | |
|---|---|---|---|
| 2,359,209 | 9/1944 | Ellinwood | 248/909 |
| 3,831,705 | 8/1974 | Glance | 280/752 |
| 4,317,582 | 3/1982 | Cottin et al. | |
| 4,373,665 | 2/1983 | Dietzsch | 280/752 |
| 4,709,943 | 12/1987 | Yoshimura et al. | 280/752 |
| 4,786,076 | 11/1988 | Wierschem | 280/777 |
| 4,861,103 | 8/1989 | Vallee | 188/377 |
| 4,978,136 | 12/1990 | Tomita et al. | 280/752 |
| 5,037,130 | 8/1991 | Okuyama | |

FOREIGN PATENT DOCUMENTS

| | | | |
|---|---|---|---|
| 2312202 | 9/1974 | Fed. Rep. of Germany | 280/748 |
| 4003952 | 8/1991 | Fed. Rep. of Germany | 280/751 |
| 1-70657 | 5/1989 | Japan | |

Primary Examiner—Karin L. Tyson
Attorney, Agent, or Firm—Cushman, Darby & Cushman

[57] ABSTRACT

A frame which forms the outer shape of a supporting bracket is constructed so as to be thinner from one portion on the side of a pillar-to-pillar member to another portion on the side of a knee panel. Inside the frame, an inner frame is constructed by ribs and the frame. Deformation of the shape of the ribs allows the supporting bracket to be easily constructed which has impact energy absorbing and deformation characteristics.

18 Claims, 13 Drawing Sheets

| NO | WIDTH DIMENSION B | PEAK LOAD |
|---|---|---|
| EXTRUSION MOLDING ① | B = 25 | 381 kg·f |
| EXTRUSION MOLDING ② | B = 20 | 323 kg·f |
| EXTRUSION MOLDING ③ | B = 15 | 231 kg·f |
| PRESS MOLDING ④ | — | 425 kg·f |

SUPPORTING BRACKET FOR KNEE PANEL

BACKGROUND OF THE INVENTION

1. Field of the Invention

The present invention relates to a supporting bracket mounted to a knee panel which protects the knees of a passenger during a collision.

2. Description of the Related Art

Generally, a vehicle is provided with a knee panel positioned in front of a front seat, for protecting the knees of a passenger during a collision. As shown in FIG. 8, a knee panel 14 is supported by a supporting bracket 40 fixed to a rod-shaped pillar-to-pillar member 10 whose both ends are respectively connected to each pillar which is usually provided on both sides of a vehicle. The supporting bracket 40 is designed to absorb impact energy by deforming itself plastically when the knees of a passenger strike against the knee panel 14.

Ideally the supporting bracket 40 deforms so that the knee panel 14 moves in a direction indicated by arrow A (as shown in FIG. 6) while keeping constant an angle at which the knee panel 14 faces a knee N of a passenger. The deformation of the supporting bracket 40 increases its resistance successively so as to absorb impact energy since the knee N moves upwardly at an angle $\theta$ with respect to a horizontal line at the time of collision, as shown in FIG. 6.

Conventionally, as shown in FIGS. 8 and 9, in order to obtain such ideal impact energy absorbing and deformation characteristics, the supporting bracket 40, having crash holes 42 perforated therethrough or beads 44 provided thereon, is formed by press-molding a sheet, plate material. (see Japanese Utility-Model Laid-Open No. 1-70657).

However, even with the formation of crash holes 42 or beads 44, it is not certain what sort of deformation characteristic the supporting bracket will in fact exhibit. Therefore, by repeatedly conducting trial-and-error tests the optimum shape of the supporting bracket 40, and the best size and location of the crash holes 42 and the beads 44 must be determined. This is time consuming and costly. In addition, the supporting bracket 40, which is manufactured by a bending process of a sheet, is heavy.

SUMMARY OF THE INVENTION

In view of the above-described facts, it is an object of the present invention to provide a supporting bracket for a knee panel, which allows its own shape of deformation to be easily determined and which has ideal impact energy absorbing and deformation characteristics.

The supporting bracket for a knee panel according to the present invention has one end fixed to a pillar-to-pillar member whose both ends are respectively connected to pillars provided on both sides of a vehicle, and another end provided for mounting a knee panel thereto which protects the knees of a passenger. The invention is characterized in that a frame in the form of a closed sectional configuration, which forms an outer shape of the supporting bracket and has a cavity inside the supporting bracket. The frame is constructed so as to become gradually thinner from a portion on the side of the pillar-to-pillar member to a portion on a mounting surface for the knee panel. The cavity of the frame is divided by a partition wall so as to form a plurality of inner frames together with the frame. Furthermore, when a load works on the knee panel in a predetermined direction, the supporting bracket is plastically and successively deformed from a portion on the side of the mounting portion of the knee panel in the predetermined direction.

The above-constructed supporting bracket for a knee panel is fixed to a pillar-to-pillar member on one end of the supporting bracket, and supports a knee panel for protecting the knees of a passenger on the other end thereof.

When the knees of a passenger strike against the knee panel at the time of a vehicle collision, the supporting bracket is plastically and gradually deformed due to the load impacted by the knees to the knee panel, and absorbs the impact load. This plastic-deforming process of the supporting bracket is described as follows.

Since a frame which forms the outer shape of the supporting bracket is constructed so as to be gradually thinner from the portion of the frame on the side of the pillar-to-pillar member to the portion of the frame to which the knee panel is mounted, when a relatively small load works on a knee panel, the supporting bracket for a knee panel deforms mostly on the side of the knee panel. The extent of the deformation of the supporting bracket decreases toward the pillar-to-pillar member. When a relatively large load works on a knee panel, the supporting bracket for a knee panel first deforms actively on the side of the knee panel, and the deformation gradually advances toward the pillar-to-pillar member side. In this case, the supporting bracket may deform for a relatively long period of time in comparison with a conventional supporting bracket. Further, a cavity formed inside the frame is divided by partition walls so as to form a plurality of inner frames together with the frame. The construction of the inner frames allows the supporting strength of the supporting bracket to increase, and also allows the deformation characteristic of the supporting bracket to be easily changed depending upon the particular configuration of the inner frames. An ideal deformation characteristic is thereby easily attained and, as a result an ideal impact energy absorbing characteristic which works on knees of a passenger is achieved. More specifically it is possible to change slightly the load deformation characteristic of the supporting bracket in the following ways: by making the inner frames located on the side of the knee panel thin and making the inner frames gradually thinner as they approach the side of the pillar-to-pillar member; by sparsely distributing the inner frames adjacent the knee panel and forming the inner frames gradually closer adjacent the pillar-to-pillar member; and by varying the shape and number of the inner frames.

As described above, varying the thickness of the, supporting bracket and changing the configuration of the inner frames enables the load deformation characteristic to be altered, and also enables the supporting bracket to be always plastically deformed irrespective of the scale and the form of the collision. The impact energy can be ideally absorbed so that a reactive force from the knee panel does not occur on the knees of a passenger.

In addition, since the supporting bracket is manufactured by extrusion molding, it can be made light. Also, the shape thereof can be easily modified, thereby saving time and cost.

DESCRIPTION OF THE PREFERRED EMBODIMENTS

Figure 1:
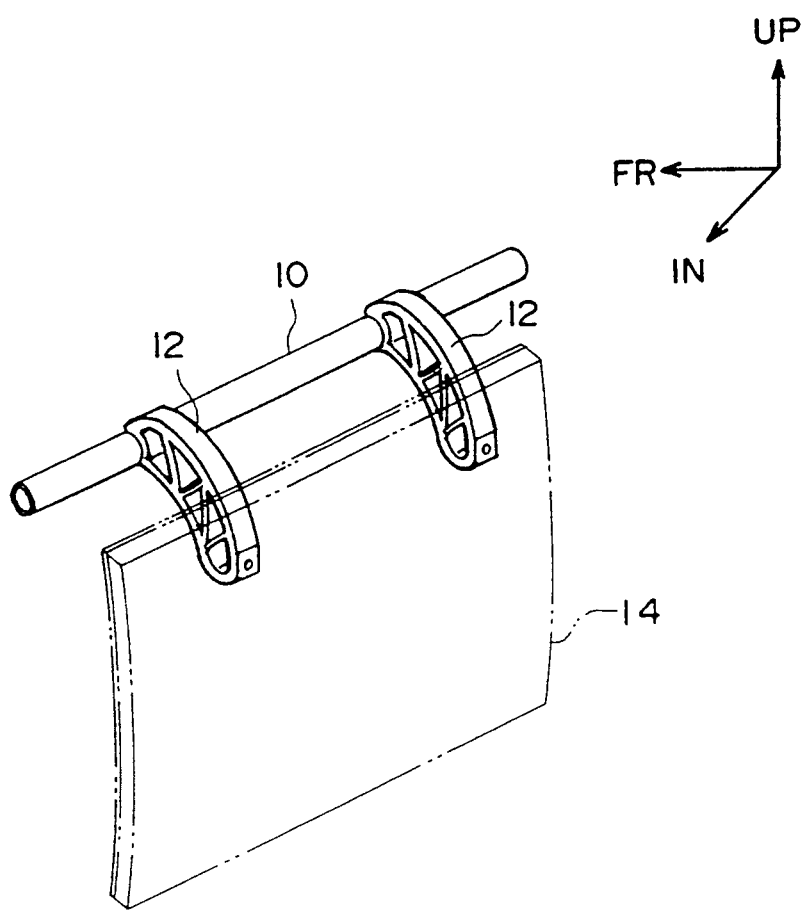
FIG. 1 is a perspective view showing a state in which a supporting bracket for a knee panel according to the present invention is assembled.

Referring to FIG. 1, one end of a supporting bracket 12 according to the present invention is fixed to a rod-shaped pillar-to-pillar member 10 whose both ends are attached to a vehicle pillar (not shown). The other end of the supporting bracket 12 is provided for mounting a knee panel 14 thereto.

Figure 2:
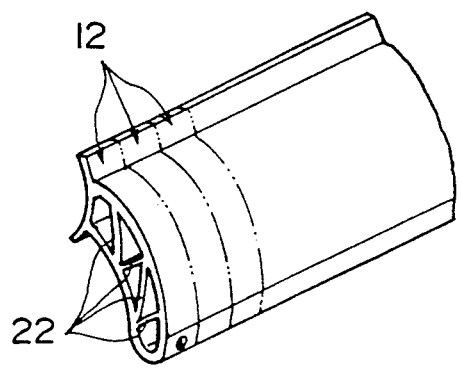
FIG. 2 is a perspective view showing a manufacturing process of the supporting bracket for a knee panel according to the present invention.

The supporting bracket 12 is manufactured, by way of example, by extrusion-molding a light-weight material such as aluminum and by cutting the material into predetermined widths (cutting along the alternate long and two short dashes lines), as shown in FIG. 2. Since the supporting bracket is processed by extrusion-molding costs normally associated with the manufacture of such brackets, such as molding expenses are reduced. In addition, the material used is lighter in comparison with a press-molding. Further, the shape of ribs 22 in the supporting bracket 12 and their position for mounting can be easily modified.

Figure 3:
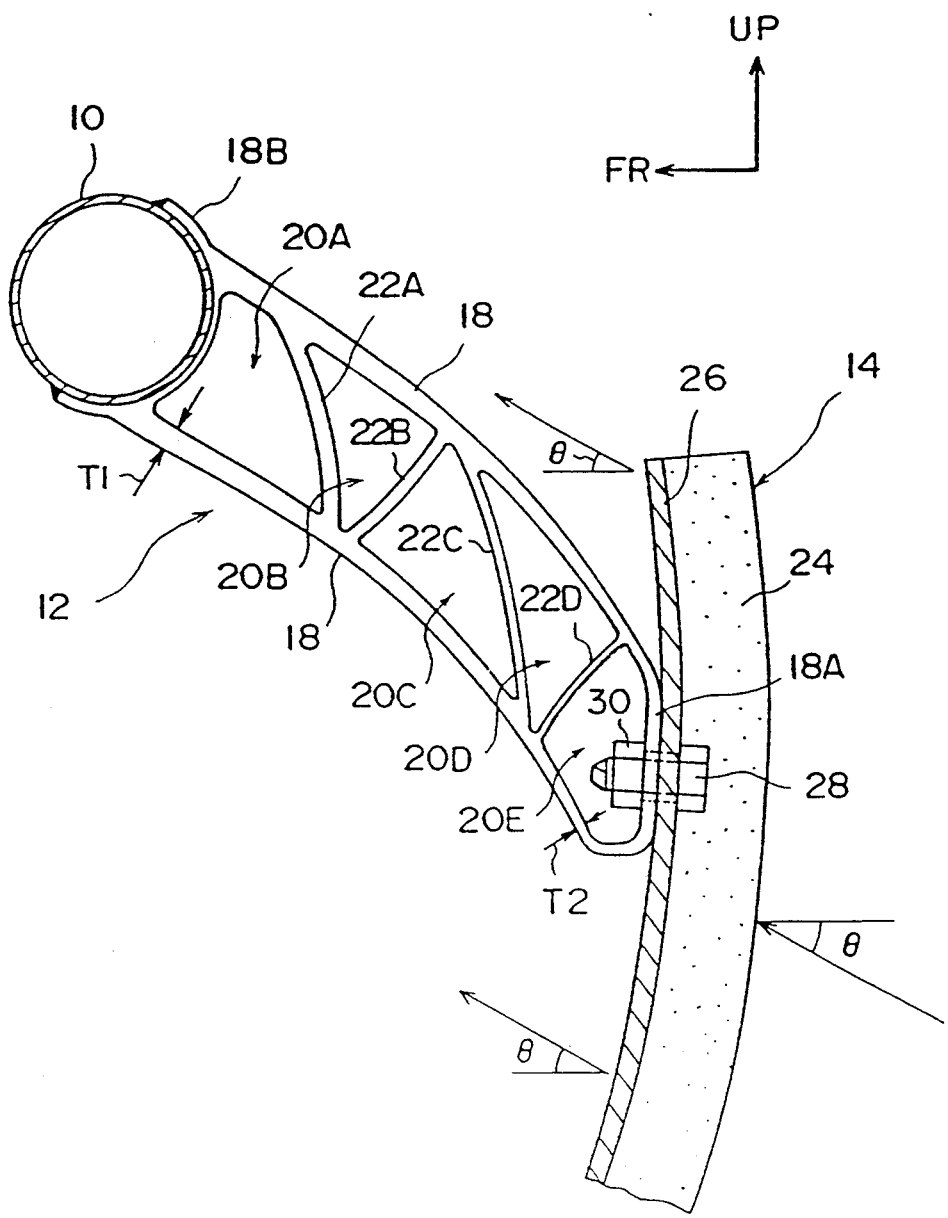
FIG. 3 is a side view showing a state prior to the deformation of the supporting bracket for a knee panel according to the present invention.

As shown in FIG. 3, the supporting bracket 12 comprises an elongated frame 18 having a closed sectional configuration with a cavity inside the frame 18 which bends slightly upwards. Ribs 22A, 22B, 22C and 22D which form a plurality of trussed inner frames 20A, 20B, 20C, 20D and 20E are located inside the supporting bracket 12, together with the frame 18.

The frame 18 which forms the outer shape of the supporting bracket 12 is constructed so as to be gradually thinner starting from the portion on the side of the pillar-to-pillar member 10 to its mounting surface 18A of the knee panel 14 (T1>T2). Therefore, when an impact load works on the knee panel 14, the supporting bracket 12 is deformed by degrees from the portions on the side of the knee panel 14.

On the side of the pillar-to-pillar member 10, the frame 18 is provided with a semi-circular bracket 18B formed so that its inner diameter equals the outer diameter of the pillar-to-pillar member 10. Both ends of the bracket 18B are pressed against the periphery of the pillar-to-pillar member 10 so as to rigidly fix the supporting bracket 12 to the pillar-to-pillar member 10.

On the other hand, the mounting surface 18A which is formed on the knee panel 14 side of the frame 18 is thick (>T2) so as to maintain the position of the knee panel 14 (the mounting angle with respect to the pillar-to-pillar member 10). Further, the bracket 12 is reinforced by the rib 22D so that the inner, frame 20E is not subject to deformation. The knee panel comprises a supporting plate 26 and a cushioning body 24, such as styrene foam or the like, secured to the supporting plate. The knee panel is secured to the mounting surface 18A by means of a bolt 28 and a nut 30.

Also, the ribs 22A, 22B, 22C and 22D located inside the frame 18 together, with the frame 18, form the trussed inner frames 20A, 20B, 20C, 20D and 20E respectively. The rib 22A (positioned on the side of the pillar-to-pillar member 10) has a large thickness. The ribs 22B, 22C and 22D (positioned on the side of the knee panel 14) are respectively constructed to be gradually made thinner. Since the ribs 22A, 22B, 22C and 22D are located such, the frame 18 is reinforced and the direction in which the supporting bracket 12 is deformed and the deformation characteristic thereof can be easily determined.

Next, referring to FIGS. 3 through 6, an embodiment in which the supporting bracket 12 is deformed will be explained below.

Figure 6:
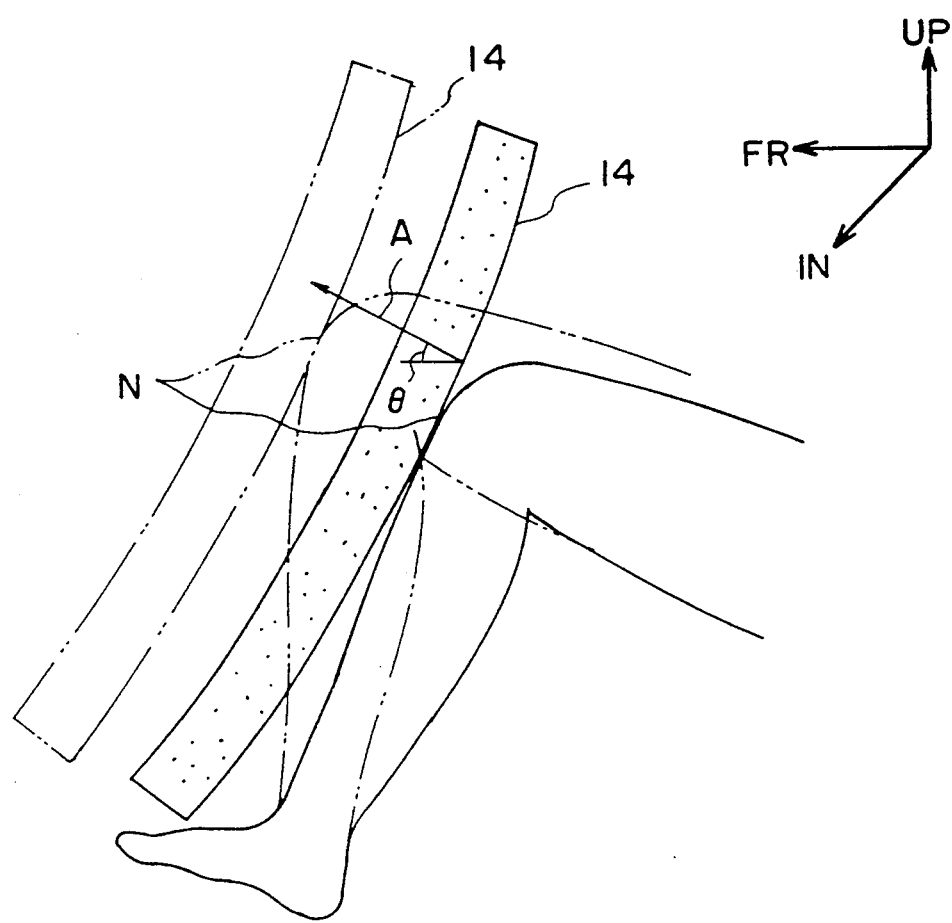
FIG. 6 is a side view showing a relationship of the relative movement between the knee panel and a knee.

As shown in FIG. 6, at the time of a vehicle collision a passenger is moved forward by inertia force and a knee N of the passenger strikes against the knee panel 14 (indicated by solid line). When the passenger moves further forward, the knee N moves in an upward direction (at an angle $\theta$) thereby pushing up the knee panel 14 (indicated by alternate long and two short dashes line). Consequently, this construction is ideal for absorbing impact force since the knee panel 14 moves in the direction indicated by arrow A while maintaining its original mounting angle.

In this case, right after the knee N strikes against the knee panel 14 (see FIG. 6) the supporting bracket 12 supports the knee panel 14 in the state prior to the supporting bracket 12 being deformed, as shown in FIG. 3.

Figure 4:
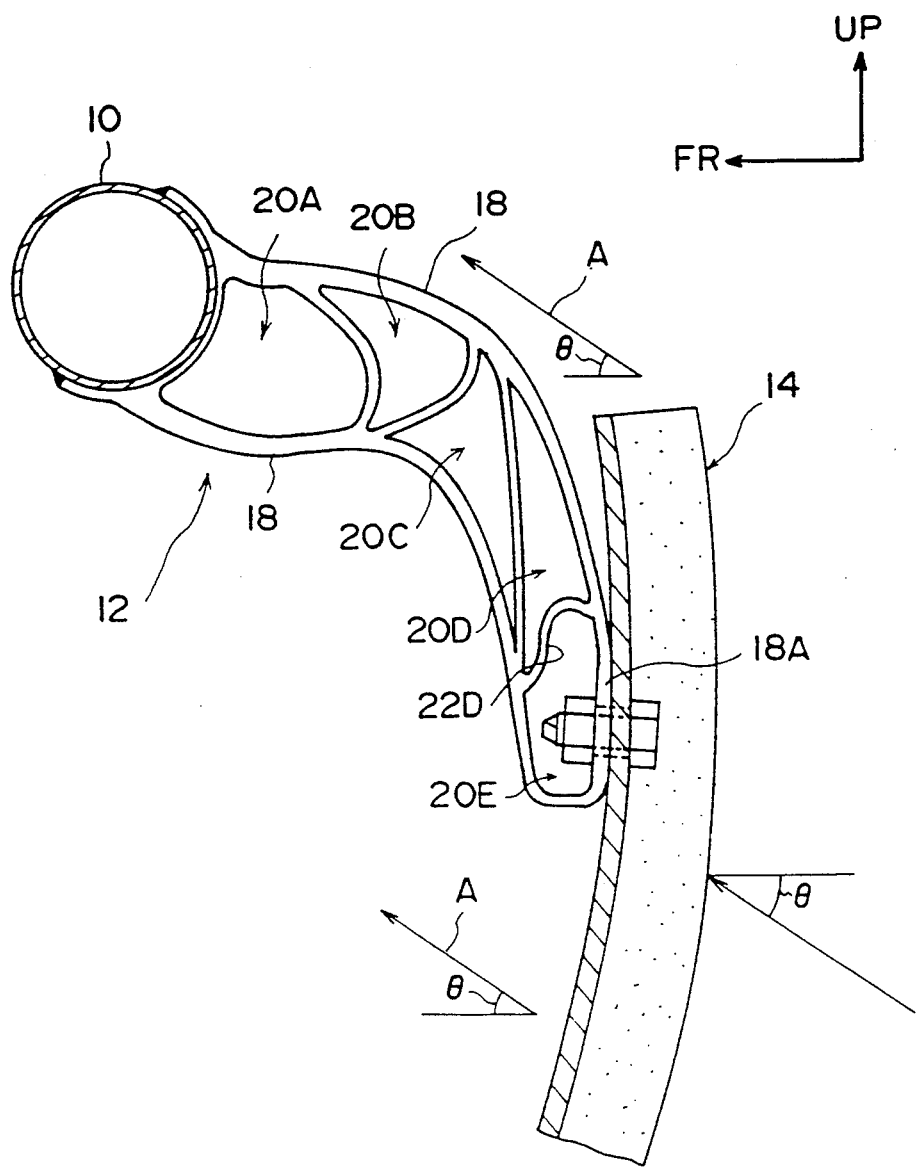
FIG. 4 is a side view showing a state after the deformation of the supporting bracket for a knee panel according to the present invention.

Next, as shown in FIG. 4, when a load works on the knee panel 14, the supporting bracket 12 largely deforms at the lower rigid portion, i.e., the inner, frames 20C, 20D which are positioned on the knee panel 14 side. The supporting bracket 12 moves in the direction indicated by arrow A while the sectional configurations of the inner frames 20A, 20B positioned on the pillar-topillar member 10 side are maintained since these inner frames 20A, 20B have high rigidities. This plastic deformation allows the initial impact force to be absorbed by a portion of the supporting bracket 12 on the knee panel. The inner frame 20E constituting the mounting surface 18A maintains a fixed sectional form by only deforming the rib 22D. Accordingly, the mounting angle of the knee panel 14 is maintained.

Figure 5:
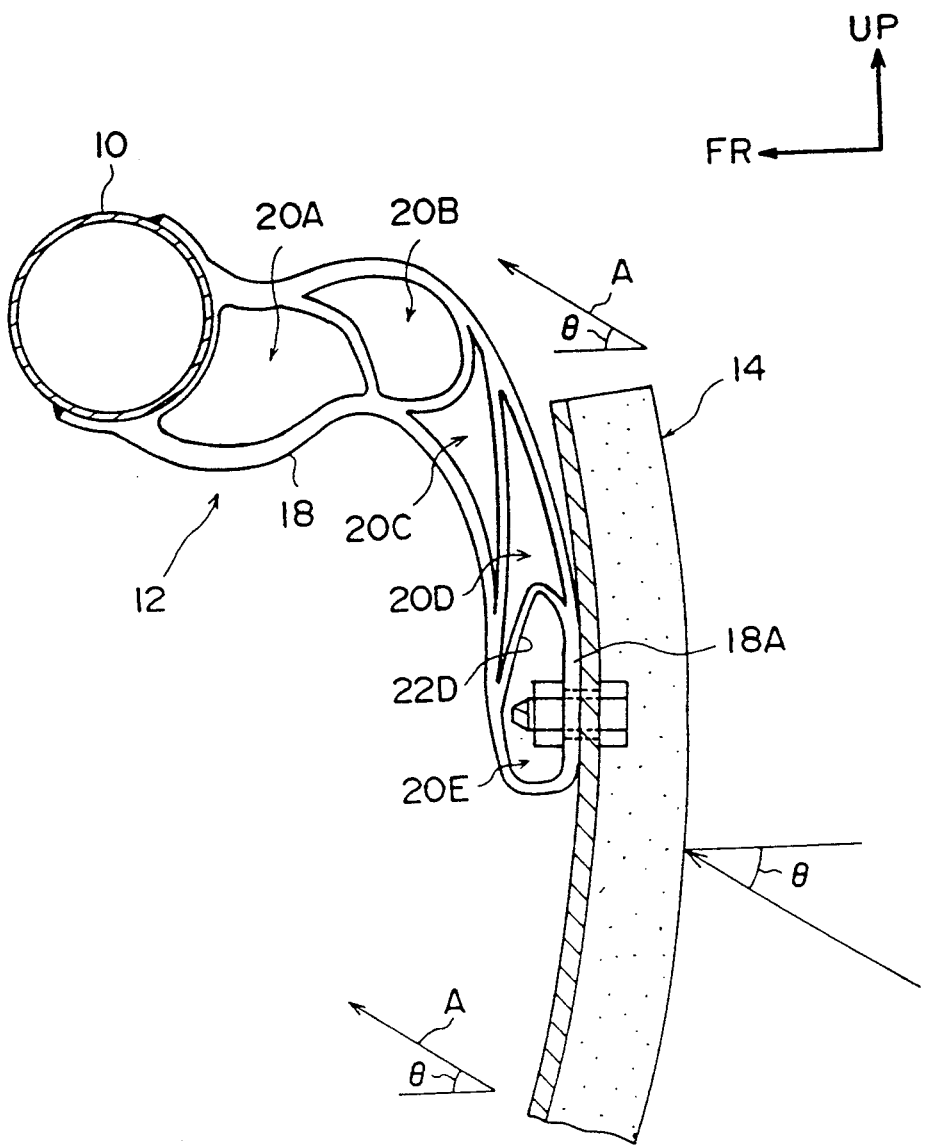
FIG. 5 is a side view showing a state after the deformation of the supporting bracket for a knee panel according to the present invention.

Furthermore, as shown in FIG. 5, when a relatively large load is applied to the knees of a passenger, the supporting bracket 12 crushes the inner frames 20C, 20D positioned on the side of the knee panel 14 and moves in the direction indicated by arrow A while upwardly bending the inner, frames 20A, 20B positioned on the side of the pillar-to-pillar member 10. Thus, the supporting bracket 12 gradually and plastically deforms at the knee panel 14 side. This plastic deforming process continues for a relatively long time in comparison with a conventional supporting bracket without applying a large reactive force to the knees of a passenger. The deformation of the supporting bracket stops at the time when the supporting bracket has become completely deformed or at the time when the load is no longer applied to the knees of a passenger. This causes the movement of the passenger to stop without giving a large shock to the knees of the passenger. The inner frame 20E constituting the mounting surface 18A still maintains its sectional form even though the rib 22D is bent. This allows the mounting angle of the knee panel 14 to be maintained.

On the other hand, the respective forms of the ribs 22A, 22B, 22C and 22D and the mounting locations thereof are not limited to the construction of the embodiment of the present invention. In determining the shape of the supporting bracket 12, the shape of the frame 18 has been determined, the shape of the supporting bracket 12 can be easily modified by means of extrusion molding at an appropriate time using a breakdown test and the like. This can significantly reduce time and cost.

Figure 7:
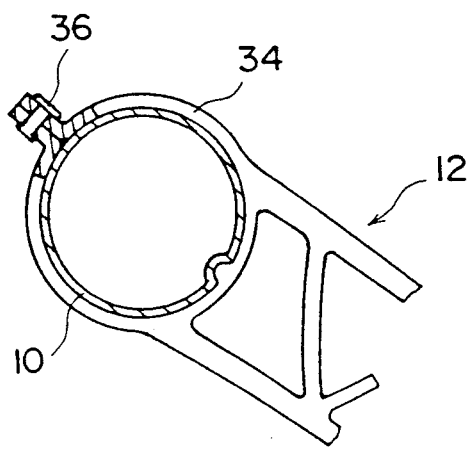
FIG. 7 is a side view showing a state in which the supporting bracket for a knee panel according to the present invention is attached to a pillar-to-pillar member.
Figure 8:
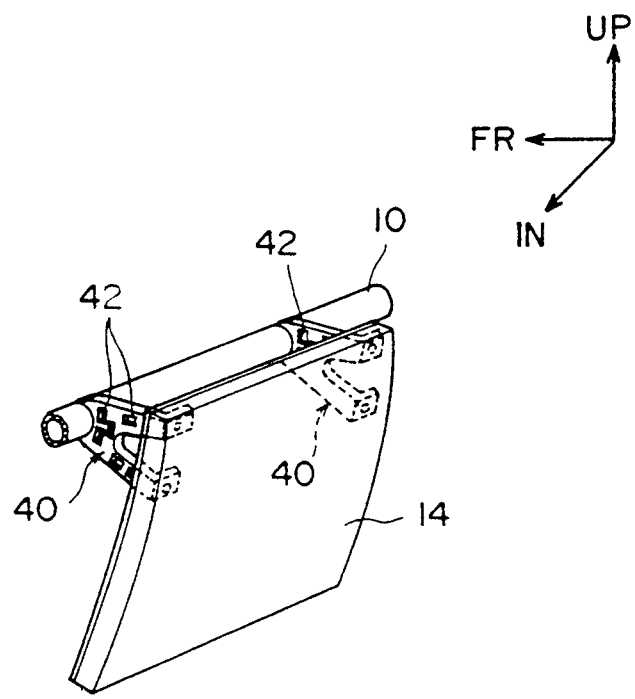
FIG. 8 is a perspective view showing a state in which a conventional supporting bracket for a knee panel is assembled.
Figure 9:
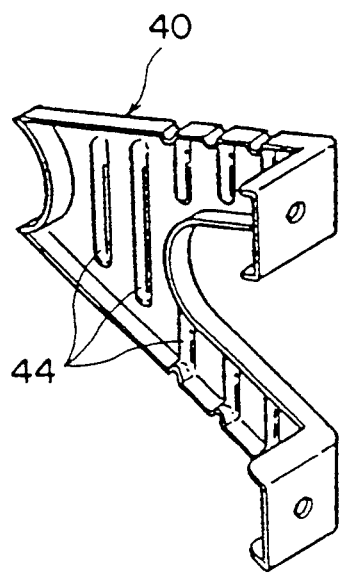
FIG. 9 is a perspective view showing a conventional supporting bracket for a knee panel.

Also, as shown in FIG. 7, a method of fixing the supporting bracket 12 to the pillar-to-pillar member 10 may be accomplished by forming the bracket 34 of the supporting bracket 12 into a substantially cylindrical shape, fitting it around and enclosing the periphery of the pillar-to-pillar member 10 and then securing the bracket 34 with a pin 36.

Meanwhile, although in the present embodiment the load deformation characteristic can be controlled by the thickness of the frame 18 of the supporting bracket 12 and the respective thicknesses of the inner frames 20A, 20B, 20C and 20D, the load deformation characteristic may be also controlled by forming the inner frames located inside the frame 18 so that the inner frames on the knee panel side sparsely formed and the inner frames are gradually formed more closely together- toward the pillar-to-pillar member side.

Figure 10:
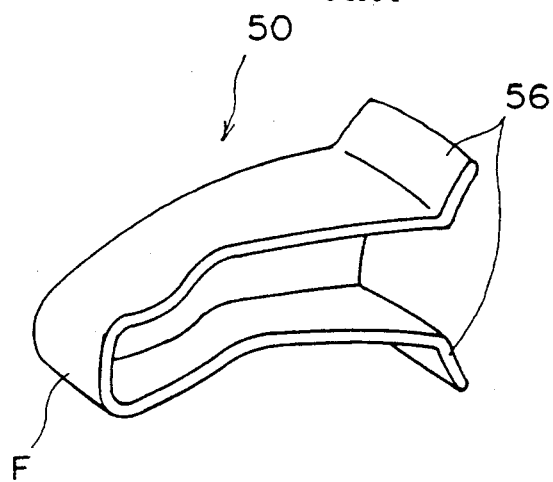
FIG. 10 is a perspective view showing a conventional supporting bracket for, a knee panel, which is used for a breakdown test.
Figure 11:
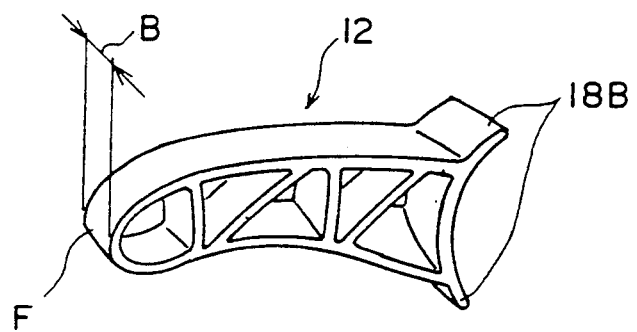
FIG. 11 is a perspective view showing the supporting bracket for a knee panel according to the present invention, which is used for a breakdown test.

Next, a breakdown tests are performed for a conventional supporting bracket 50 for a knee panel, which is made by press-molding aluminum material as shown in FIG. 10, and for the supporting bracket 12 for a knee panel according to the present embodiment, which is made by extrusion molding, as shown in FIG. 11. How the displacement amount (mm) on a load surface F with respect to a working load (kg·f) differs for each type of bracket will be explained hereinafter.

Figure 12:
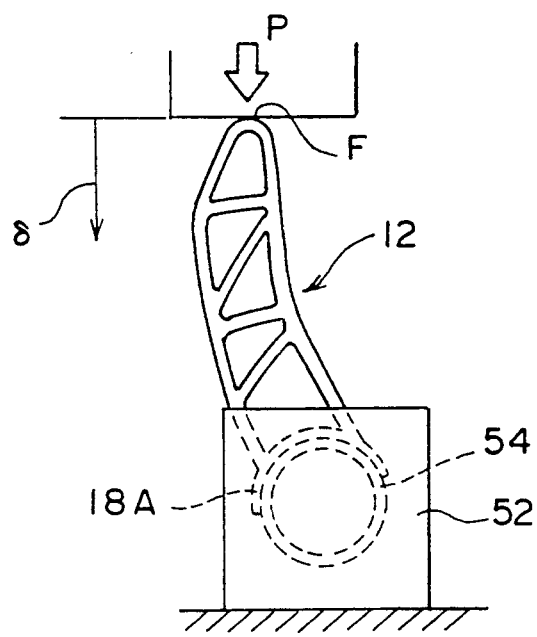
FIG. 12 is a side view showing a state in which the supporting bracket for a knee panel according to the present invention is set in a breakdown test device.

As shown in FIG. 12, in the breakdown test, the brackets 18B and 56 (see FIGS. 11 and 10) of the respective supporting brackets 12 and 50 are fixed to respective pipe-shaped fixed jigs 54 disposed in respective fixed tables 52. The displacement amount $\delta$ on the load surface F (which corresponds to a mounting portion for a knee panel) is measured while a working load P is applied to the load surface F.

Figures 13, 14:
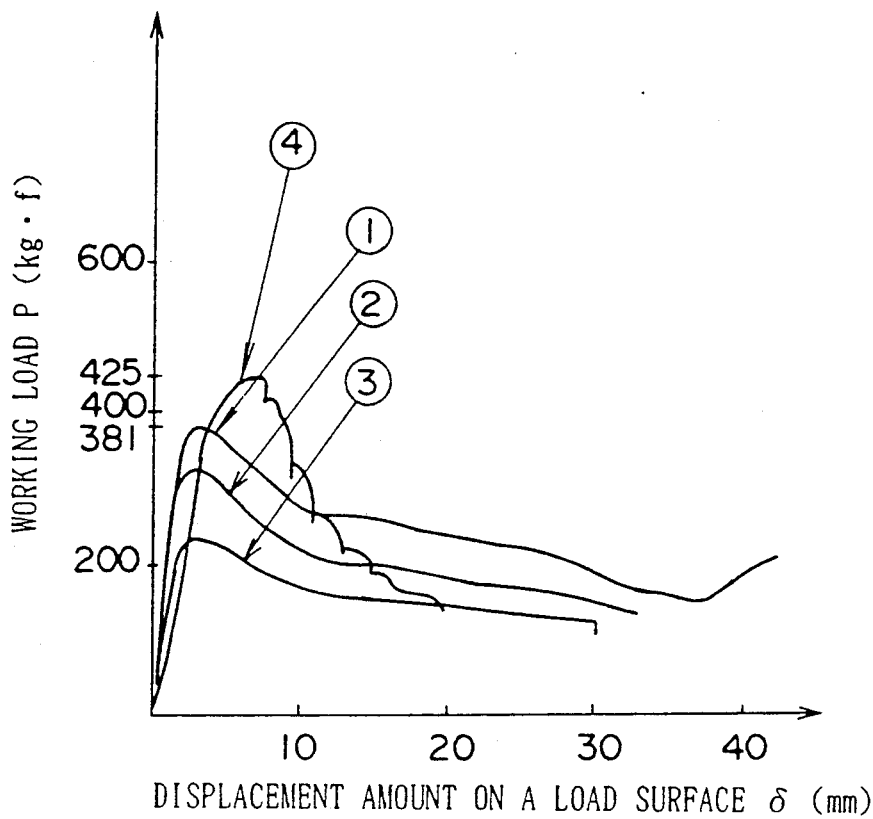
FIG. 13 is a graphic representation showing a relationship between a working load and a displacement amount on a load surface as an experimental result of the breakdown test.
FIG. 14 is a list showing experimental results of the breakdown test.
Figure 15:
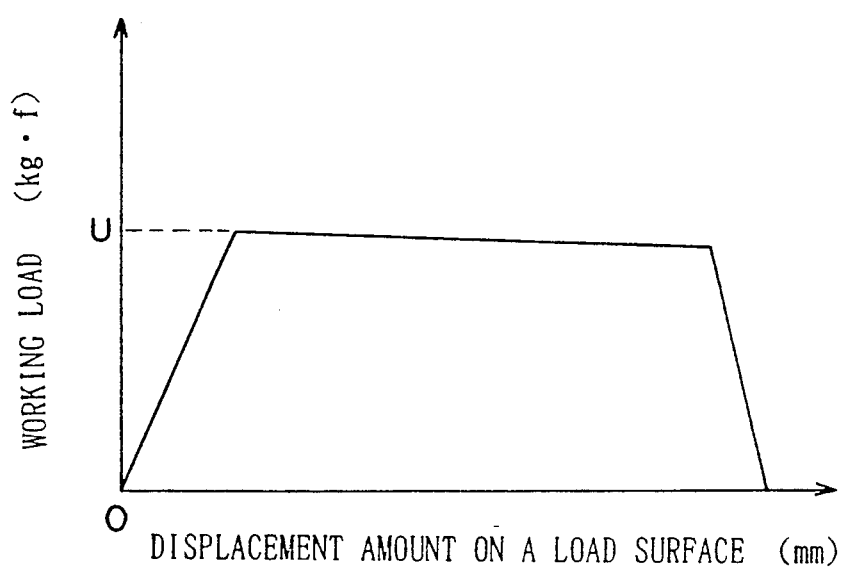
FIG. 15 is a graphic representation showing an ideal energy absorbing characteristic.

It can be seen from the graphic representation of FIG. 13 and the list of FIG. 14, that the conventional supporting bracket 50 made by press molding has a large peak load (425kg·f) in comparison with the supporting bracket 12 made by extrusion molding. Thereafter, the load of the conventional supporting bracket 50 greatly decreases, i.e., the decreasing gradient of its load is large (indicated by (4) in FIG. 13). This curve is, judging from a graphic representation of an ideal energy absorbing characteristic shown in FIG. 15, very different from the ideal displacement characteristic in which a load decreases from a peak load U at an approximately horizontal gradient. The curve (4) of the conventional supporting bracket 50 shows an undesirable energy absorbing characteristic since the supporting bracket deforms slightly and a large reactive force occurs when this curve does not reach a relatively large peak load level.

In contrast to the above case, it can be seen that the supporting bracket 12 of the present embodiment has a small peak load (381kg·f), and thereafter its load decreases slightly, i.e., the decreasing gradient of its load is small (indicated by (1) in FIG. 13). This experimental result indicates, judging from the graphic representation of FIG. 15, that the energy absorbing characteristic of the supporting bracket 12 is desirable because the supporting bracket can be easily deformed due to its peak load being relatively small, and because load is always absorbed by a plastic deformation, i.e., because the supporting bracket deforms gradually, thereby resulting in a small reactive force. Further, it indicates that it is possible to absorb the energy applied to the knees of a passenger without imparting a large shock thereto.

Further, the supporting bracket 12 of the present embodiment allows the energy absorbing characteristic of the supporting bracket 12 to be easily adjusted by changing the width dimension B thereof, as can be seen from the graphic representation of FIG. 13 and the list of FIG. 14.

What is claimed is:

1. A bracket for supporting a knee panel for protecting the knees of a passenger in a motor vehicle, said bracket having a forward end adapted to be fixed to a vehicle body and a rearward end for mounting said knee panel, said bracket having a longitudinal direction defined by said forward and rearward ends and comprising:

a frame having a closed sectional configuration and a hollow interior said frame becoming gradually thinner from the forward end to the rearward end of the bracket; and a plurality of partition walls which divide the interior of said frame so as to form, together with said frame, a plurality of inner frames each having a closed sectional configuration, the bracket being crushably deformable in said longitudinal direction and having the portion adjacent the rearward end being less rigid than the portion adjacent the forward end.

2. A supporting bracket for a knee panel according to claim 1, wherein an intermediate portion of said frame is bent transversely of said longitudinal direction.

3. A supporting bracket for a knee panel according to claim 1, wherein the forward end of said bracket is adapted to be fixed to a pillar-to-pillar member suspended between pillars fixed to said vehicle body, said pillar-to-pillar member extending in a direction transverse to said longitudinal direction of said vehicle body.

4. A supporting bracket for a knee panel according to claim 3, wherein a semi-circular bracket encloses said pillar-to-pillar member and is formed on a mounting portion of said frame for attaching said frame to said pillar-to-pillar member.

5. A supporting bracket for a knee panel according to claim 1, wherein a substantially cylindrical bracket is formed on a mounting portion of said frame, said cylindrical bracket surrounding an outer periphery of a pillar-to-pillar member and attaching said frame to said pillar-to-pillar member.

6. A supporting bracket for a knee panel according to claim 1, wherein a mounting portion for said knee panel is disposed at said rearward end of said bracket and is constructed so as to have a thickness larger than a thinnest portion of said frame.

7. A supporting bracket for a knee panel according to claim 1, wherein said partition walls forming said inner frames become thinner from said portion of the bracket adjacent the forward end to said portion of the bracket adjacent the rearward end.

8. A supporting bracket for a knee panel according to claim 1, wherein a deformation of said bracket at the time of a vehicle collision is determined according to positions and thicknesses of said partition walls which divide the hollow interior of said frame.

9. A supporting bracket for a knee panel according to claim 1, wherein said supporting bracket is made from a light-weight material processed by extrusion molding, said supporting bracket being manufactured by cutting said material to a predetermined width in a direction perpendicular to a direction in which said material is extrusion molded.

10. A bracket for supporting a knee panel which protects the knee of a passenger within a vehicle, comprising:
(a) a frame having a pair of outer portions disposed substantially parallel to one another, first ends of said pair of outer portions being supported to a vehicle body and second ends of said pair of outer portions supporting the knee panel, said pair of outer portions having respective rigidities which progressively decrease from said first ends to said second ends;
(b) a plurality of partition walls connecting said pair of outer portions of said frame and dividing a space therebetween into a plurality of closed sections; and
(c) a mounting portion for the knee panel being provided at said second ends of said pair of outer portions of said frame, said mounting portion being more rigid than portions of the frame adjacent thereto.

11. A supporting bracket for a knee panel according to claim 10, wherein said pair of outer portions is integrally provided with a portion fixed to a pillar-to-pillar member suspended between pillars fixed to said vehicle body, said pillar-to-pillar member extending in a direction transverse to said longitudinal direction of said vehicle body.

12. A supporting bracket for a knee panel according to claim 11, wherein said portion fixed to said pillar-to-pillar member is formed so as to be circular in shape and disposed along an outer periphery of said pillar-to-pillar member.

13. A supporting bracket for a knee panel according to claim 10, wherein said plurality of partition walls form, together with said pair of frames, triangular closed sections.

14. A supporting bracket for a knee panel used to protect the knees of a passenger in a vehicle, comprising:
(a) a pair of outer portions which are disposed substantially parallel to one another and have respective rigidities which gradually decrease from first ends to second ends thereof in a longitudinal direction of the vehicle;
(b) a first mounting portion being fixed to the vehicle body and connecting said first ends of said outer portions with one another;
(c) a second mounting portion being fixed to the knee panel and connecting said second ends to one another; and
(d) a plurality of partition walls connecting said pair of outer portions and forming a plurality of closed sections in a space between said outer portions.

15. A supporting bracket for a knee panel according to claim 14, wherein said partition walls adjacent said second ends of said pair of outer portions are less rigid than those adjacent said first ends of said pair of outer portions.

16. A supporting bracket for a knee panel according to claim 14, wherein said second mounting portion has a rigidity higher than the rigidity of a portion having the lowest rigidity of said supporting bracket.

17. A supporting bracket for a knee panel according to claim 14, wherein said first mounting portion has a circular portion fixed to an outer periphery of a pipe which is secured to the vehicle body.

18. A bracket for supporting a knee panel which protects the knees of a passenger in a motor vehicle, said bracket having a forward end being fixed to a vehicle body and a rearward end being fixed to said knee panel, said bracket extending in the longitudinal direction of the vehicle body and comprising:
a frame having a closed sectional configuration and a hollow interior, said frame becoming gradually thinner from the forward end to the rearward end of said bracket; and
a plurality of partition walls which divide the interior of said frame so as to form, together with said frame, a plurality of inner frames each having a closed sectional configuration, the portion of the bracket adjacent the knee panel being less rigid than the portion of the bracket adjacent the vehicle body, said partition walls becoming progressively thinner from the forward end to the rearward end of said bracket, said forward end of said bracket being fixed to a pillar-to-pillar member suspended between pillars fixed to said vehicle body, said pillar-to-pillar member extending in a direction transverse to said longitudinal direction of said vehicle body.

* * * * *